US009560626B2

(12) United States Patent
Wachter et al.

(10) Patent No.: US 9,560,626 B2
(45) Date of Patent: Jan. 31, 2017

(54) METHOD AND APPARATUS FOR USING HISTORIC NETWORK INFORMATION FOR DETERMINING APPROXIMATE POSITION

(71) Applicant: QUALCOMM Incorporated, San Diego, CA (US)

(72) Inventors: Andreas Klaus Wachter, Menlo Park, CA (US); Ie-Hong Lin, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/448,687

(22) Filed: Jul. 31, 2014

(65) Prior Publication Data
US 2014/0342751 A1    Nov. 20, 2014

Related U.S. Application Data

(63) Continuation of application No. 12/014,673, filed on Jan. 15, 2008, now Pat. No. 8,798,639.
(Continued)

(51) Int. Cl.
*H04W 24/00* (2009.01)
*H04W 64/00* (2009.01)
(Continued)

(52) U.S. Cl.
CPC ........... *H04W 64/006* (2013.01); *H04W 64/00* (2013.01); *G01S 19/05* (2013.01); *H04J 11/0069* (2013.01)

(58) Field of Classification Search
CPC ........ H04W 64/00; H04W 28/26; H04W 4/02; H04W 4/20; H04W 64/006; H04W 80/06; G01S 19/05; G01S 5/0252; H04J 11/0069; H04L 12/46; H04L 47/40
(Continued)

(56) References Cited

U.S. PATENT DOCUMENTS 7,167,714 B2    1/2007 Dressler et al.
7,551,928 B2 *  6/2009 Nielsen ............. H04M 1/72572
                                                340/8.1
(Continued)

FOREIGN PATENT DOCUMENTS

CN    1389078 A    1/2003
CN    1859799 A    11/2006
(Continued)

OTHER PUBLICATIONS

International Search Report, PCT/US2008/051233, International Search Authority, European Patent Office, Jul. 10, 2008.
(Continued)

*Primary Examiner* — Allahyar Kasraian
*Assistant Examiner* — B. M. M Hannan
(74) *Attorney, Agent, or Firm* — Linda G. Gunderson

(57) ABSTRACT

Systems and techniques to determine an approximate location for a mobile device using historic location information. In an aspect, a SUPL Location Platform (SLP), which is a location server in SUPL, may receive data from SUPL Enabled Terminal (SET). The data may include the Multiple Location IDs Parameter. The real time Location ID Parameter may not have a current status. The SLP may determine an approximate position for the SET based on the Multiple Location IDs Parameter data received from the SET. The SLP may then send the approximate position to the SET or a SUPL Agent, or may use the approximate position information in another way.

13 Claims, 5 Drawing Sheets

Related U.S. Application Data

(60) Provisional application No. 60/885,338, filed on Jan. 17, 2007.

(51) Int. Cl.
*G01S 19/05* (2010.01)
*H04J 11/00* (2006.01)

(58) Field of Classification Search
USPC .............. 455/456.1, 452.1, 456.3, 456.5
See application file for complete search history.

(56) References Cited

U.S. PATENT DOCUMENTS

| | | | |
|---|---|---|---|
| 7,729,706 B2 * | 6/2010 | Kim et al. ............... | 455/456.1 |
| 7,764,231 B1 | 7/2010 | Karr et al. | |
| 8,798,639 B2 | 8/2014 | Wachter et al. | |
| 8,953,567 B2 * | 2/2015 | Annamalai ............ | H04W 8/04 370/338 |
| 2003/0069027 A1 | 4/2003 | Heinonen et al. | |
| 2004/0127229 A1 | 7/2004 | Ishii | |
| 2004/0192341 A1 | 9/2004 | Wang et al. | |
| 2004/0259575 A1 * | 12/2004 | Perez-Breva ......... | H04W 64/00 455/456.1 |
| 2005/0055578 A1 * | 3/2005 | Wright .................... | G06F 21/32 726/4 |
| 2005/0153706 A1 | 7/2005 | Niemenmaa et al. | |
| 2006/0058042 A1 | 3/2006 | Shim | |
| 2006/0063536 A1 * | 3/2006 | Kim ....................... | G01S 5/0036 455/456.1 |
| 2006/0217130 A1 | 9/2006 | Rowitch et al. | |
| 2006/0238418 A1 | 10/2006 | Monnerat et al. | |
| 2006/0293051 A1 | 12/2006 | Ewert et al. | |
| 2007/0082681 A1 * | 4/2007 | Kim et al. ............... | 455/456.1 |
| 2007/0155401 A1 | 7/2007 | Ward et al. | |
| 2007/0287448 A1 * | 12/2007 | Kim ....................... | H04W 8/12 455/433 |
| 2007/0298793 A1 * | 12/2007 | Dawson .................. | 455/435.1 |
| 2008/0014962 A1 * | 1/2008 | Shim ....................... | H04W 4/02 455/456.1 |
| 2008/0052395 A1 * | 2/2008 | Wright .................... | H04L 63/20 709/224 |
| 2009/0036142 A1 * | 2/2009 | Yan ........................ | H04W 60/00 455/456.1 |
| 2009/0143076 A1 | 6/2009 | Wachter et al. | |
| 2010/0062752 A1 * | 3/2010 | Shim ............................ | 455/418 |
| 2010/0273480 A1 * | 10/2010 | Shim ............................ | 455/433 |

FOREIGN PATENT DOCUMENTS

| | | |
|---|---|---|
| EP | 1773024 | 4/2007 |
| EP | 2007149 A1 | 12/2008 |
| JP | 2002008164 A | 1/2002 |
| JP | 2004012353 A | 1/2004 |
| JP | 2004214737 A | 7/2004 |
| JP | 2007518327 A | 7/2007 |
| RU | 2255433 | 6/2005 |
| WO | WO-03005750 | 1/2003 |
| WO | WO-2004062178 | 7/2004 |
| WO | WO-2005069671 A1 | 7/2005 |
| WO | WO-2006102508 A1 | 9/2006 |

OTHER PUBLICATIONS

Qualcomm et al., "SUPL_2_0_TS_ULP_Multipe_Location_ID_enhancement", SIRF Technology, Telecom Italia, Polaris Wireless, Motorola, LGE, Samsung, Dec. 13, 2006, URL,http://member.openmobilealliance.org/ftp/Public_documents/LOC/2006/OMA-LOC-2006-0413R02-CR_SUPL_2_0_TS_ULP_Multiple_Location_ID_enhancement.zip.
Taiwan Search Report—TW097101828—TIPO—Jan. 17, 2012.
Written Opinion, PCT/US08/051233, International Search Authority, European Patent Office, Jul. 10, 2008.
Taiwan Search Report—TW102114259—TIPO—Dec. 3, 2014.
Partial European Search Report—EP14175686—Search Authority—Munich—Mar. 11, 2015.
Euopean Search Report—EP14175686—Search Authority—Munich—Aug. 7, 2015.
Taiwan Search Report—TW102114259—TIPO—Sep. 7, 2015.
"UserPlane Location Protocol ; OMA-TS-ULP-V2 0-20061121-D", OMA-TS-ULP-V2—0-20061121-D, Open Mobile Alliance (OMAT, 4330 La Jolla Village Dr., Suite 110 San Diego, CA 92122 ; USA No. 2.0 Nov. 21, 2006, pp. 1-224, XP064091668, Retrieved from the Internet: Download by EPO on Oct. 13, 2011.

* cited by examiner

METHOD AND APPARATUS FOR USING HISTORIC NETWORK INFORMATION FOR DETERMINING APPROXIMATE POSITION

CROSS-REFERENCE TO RELATED APPLICATION

This application claims priority to and is a continuation of U.S. patent application Ser. No. 12/014,673, filed on Jan. 15, 2008, which claims priority to and is a non-provisional of U.S. Provisional Patent Application No. 60/885,338, filed on Jan. 17, 2007, which is hereby incorporated by reference in its entirety.

BACKGROUND

Field of the Invention

The present disclosure relates generally to communication, and more specifically to techniques for supporting positioning.

Description of Related Art

Wireless communication networks are widely deployed to provide various communication services, such as voice, video, packet data, messaging, broadcast, etc. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal FDMA (OFDMA) networks.

It is often desirable, and sometimes necessary, to know the location of a terminal in a wireless network. The terms "location" and "position" are synonymous and are used interchangeably herein. For example, a user may utilize the terminal to browse websites and may click on location sensitive content. The location of the terminal may then be determined and used to provide appropriate content to the user. There are many other scenarios in which knowledge of the location of the terminal is useful or necessary.

Various positioning methods may be used to determine the location of a terminal Each positioning method may use certain information and may require certain capabilities at the terminal and/or a location server in order to compute a location estimate for the terminal. It is desirable to support positioning in an efficient manner in order to conserve resources and reduce delay.

SUMMARY

Techniques to support positioning for terminals are described herein. Positioning refers to a process to measure/compute a geographic location estimate of a target device. A location estimate may also be referred to as a position estimate, a position fix, etc. Positioning may be supported with a location architecture/solution such as Secure User Plane Location (SUPL) from Open Mobile Alliance (OMA).

In an aspect, a SUPL Location Platform (SLP), which is a location server in SUPL, may receive data from SUPL Enabled Terminal (SET). The data may include the Multiple Location IDs Parameter. The real time Location ID Parameter may not have a "current" status. The SLP may determine an approximate position for the SET based on the Multiple Location IDs Parameter data received from the SET. The SLP may then send the approximate position to the SET or a SUPL Agent, or may use the approximate position information in another way.

Various aspects and features of the disclosure are described in further detail below.

DETAILED DESCRIPTION

Figure 1:
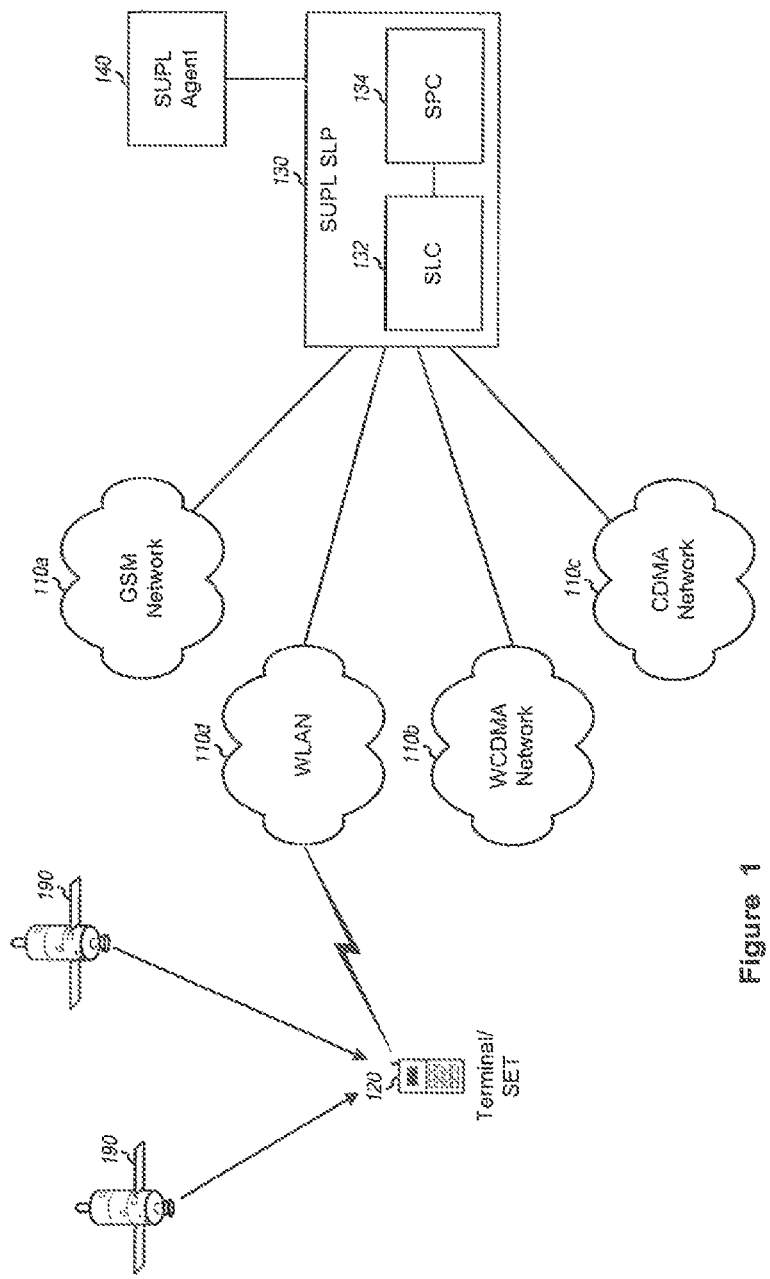
FIG. 1 shows a deployment of different radio access networks.

As noted above, the ability to determine the location of a mobile device can be beneficial, or even necessary. A number of positioning techniques are currently available. However, under some circumstances, obtaining a location with sufficient accuracy can be challenging.

Some positioning techniques use an initial coarse position estimate to increase the accuracy of the provided position, to reduce the time to determining the provided position, or both. For example, in a satellite positioning system such as GPS, the seed position allows the satellite acquisition process to be performed more quickly, since the search space can be reduced. In some circumstances, the initial coarse position estimate is needed to successfully determine a higher accuracy position.

Some techniques use the serving cell identity of a mobile station at the time of the location request to provide a coarse position estimate. However, in some situations, the serving cell identity information is not accurate, which can degrade positioning performance (e.g., increase the amount of time needed to obtain a position fix). Systems and techniques herein provide for more accurate and reliable position estimates.

Techniques for supporting positioning in wireless networks are described herein. The techniques may be used for various wireless networks such as wireless wide area networks (WWANs), wireless metropolitan area networks (WMANs), wireless local area networks (WLANs), broadcast networks, etc. The terms "network" and "system" are often used interchangeably.

A WWAN is a wireless network that provides communication coverage for a large geographic area such as, e.g., a city, a state, or an entire country. A WWAN may be a cellular network such as a CDMA network, a TDMA network, an FDMA network, an OFDMA network, etc. A CDMA network may implement a radio technology such as Wideband CDMA (WCDMA), cdma2000, Time Division-Synchronous Code Division Multiple Access (TD-SCDMA), etc. cdma2000 covers IS-2000, IS-95, and IS-856 standards. In the description below, the term "CDMA" refers to cdma2000. A TDMA network may implement a radio technology such as Global System for Mobile Communications (GSM). An OFDMA network may implement a radio technology such as Ultra Mobile Broadband (UMB), Long Term Evolution (LTE), Flash-OFDM®, etc. These various radio technologies and standards are known in the art. WCDMA, GSM and LTE are described in documents from an organization named "3rd Generation Partnership Project" (3GPP). CDMA and UMB are described in documents from an organization named "3rd Generation Partnership Project 2" (3GPP2). 3GPP and 3GPP2 documents are publicly available.

A WLAN is a wireless network that provides communication coverage for a small or medium geographic area such as, e.g., a building, a shop, a mall, a home, etc. A WLAN may implement a radio technology such as any defined by IEEE 802.11, Hiperlan, etc. A WMAN may implement a radio technology such as any defined by IEEE 802.16. IEEE 802.11 and 802.16 are two families of standards from The Institute of Electrical and Electronics Engineers (IEEE). The IEEE 802.11 family includes 802.11a, 802.11b, 802.11g and 802.11n standards and is commonly referred to as Wi-Fi. The IEEE 802.16 family includes 802.16e and 802.16m standards and is commonly referred to as WiMAX.

FIG. 1 shows an example deployment of different radio access networks (RANs), which include a GSM network 110a, a WCDMA network 110b, a CDMA network 110c, and a WLAN 110d. A radio access network supports radio communication for terminals and may be all or part of a WWAN, a WMAN, or a WLAN. For example, a WWAN may include a radio access network, a core network, and/or other networks, and only the radio access network portion is shown in FIG. 1 for simplicity. A radio access network may also be referred to as a radio network, an access network, etc. GSM network 110a, WCDMA network 110b, and CDMA network 110c may each include any number of base stations that support radio communication for terminals within their coverage areas. A base station may also be referred to as a Node B, an evolved Node B, etc. In GSM and WCDMA networks, the term "cell" can refer to the smallest coverage area of a base station and/or the base station subsystem serving this coverage area. In CDMA networks, the term "sector" can refer to the smallest coverage area of a base station and/or the base station subsystem serving this coverage area. WLAN 110d may include any number of access points (WLAN APs) that support radio communication for terminals associated with these access points.

A terminal such as SET 120 may communicate with GSM network 110a, WCDMA network 110b, CDMA network 110c, or WLAN 110d at any given moment to obtain communication services. SET 120 may also simply receive signals from these networks in order to make measurements or obtain information useful in computing its location. SET 120 may be stationary or mobile and may also be referred to as a mobile station, a user equipment, a subscriber station, a station, etc. A terminal may be a cellular phone, a personal digital assistant (PDA), a handheld device, a wireless device, a laptop computer, a wireless modem, a cordless phone, a telemetry device, a tracking device, etc. Terminal 120 may also be referred to as a SUPL Enabled Terminal (SET) in SUPL. The terms "terminal" and "SET" are used interchangeably herein.

SET 120 may receive and measure signals from satellites 190 to obtain pseudo-range measurements for the satellites. Satellites 190 may be part of the United States Global Positioning System (GPS), the European Galileo system, the Russian GLONASS system, or some other satellite positioning system (SPS). SET 120 may also receive and measure signals from access points in WLAN 110d and/or signals from base stations in radio access networks 110a, 110b and/or 110c to obtain timing and/or signal strength measurements for the access points and/or base stations. SET 120 may communicate with one radio access network and may, at the same time or an earlier time, receive and measure signals from access points and/or base stations in other radio access networks to obtain measurements for these other access points and/or base stations. The measurements for satellites 190 and/or the measurements for the access points and/or base stations may be used to determine the location of SET 120.

Although aspects below are described using SUPL in an illustrative example, the use of historic network information is not limited to Secure User Plane Location (SUPL) systems.

A SUPL Location Platform (SLP) 130 may communicate with SET 120 to support location services and/or positioning for the SET. The communication between SLP 130 and SET 120 may be via any one of radio access networks 110a through 110d and/or via other networks (e.g., the Internet). SLP 130 may be separate from radio access networks 110a, 110b, 110c and 110d and may be from or part of a WWAN that includes radio access network 110a, 110b, 110c and/or 110d. SLP 130 may be a Home SLP (H-SLP), a Visited SLP (V-SLP), or an Emergency SLP (E-SLP).

SLP 130 may support SUPL service management and positioning for terminals communicating with radio access networks 110a through 110d. SUPL service management may include managing locations of SETs and storing, extracting, and modifying location information of target SETs. SLP 130 may include a SUPL Location Center (SLC) 132 and a SUPL Positioning Center (SPC) 134. SLC 132 may perform various functions for location services, coordinate the operation of SUPL, and interact with SETs. SLC 132 may perform functions for privacy, initiation, security, roaming support, charging/billing, service management, position calculation, etc. SPC 134 may support positioning for SETs and delivery of assistance data to the SETs and may also be responsible for messages and procedures used for position calculation. SPC 134 may perform functions for security, assistance data delivery, reference retrieval, position calculation, etc. SPC 134 may have access to GPS receivers (a reference network, perhaps a global one) and may receive signals for satellites so that it can provide assistance data.

A SUPL agent 140 may communicate with SLP 130 to obtain location information for SET 120. A SUPL agent is a service access point that accesses network resources to obtain location information. Location information may comprise a location estimate and/or any information related to location. SET 120 may also have a SUPL agent that is resident within the SET. SET 120, SLP 130, and SUPL Agent 140 may each support any SUPL version. SUPL Version 2.0 (SUPL 2.0) is described in OMA-AD-SUPL-V2, entitled "Secure User Plane Location Architecture," Aug. 31, 2007, and OMA-TS-ULP-V2, entitled "UserPlane Location Protocol," Sep. 27, 2007. These SUPL documents are publicly available from OMA.

SET 120 may support one or more positioning methods, or measurements for one or more positioning methods, which may be used to determine the location of the SET. Table 1 lists some positioning methods that may be supported by SET 120 and provides a short description of each positioning method. Advanced Forward Link Trilateration (AFLT), Enhanced Observed Time Difference (E-OTD), and Observed Time Difference Of Arrival (OTDOA) are positioning methods based on measurements for base stations in a radio access network, and may be referred to more generally as terrestrial range-based techniques. SET 120 may implement hybrid positioning techniques (combinations of different positioning techniques, such as GPS and terrestrial ranging). In Table 1 as well as much of the description herein, "GPS" generically refers to positioning based on any satellite positioning system, e.g., GPS, Galileo, GLONASS, etc.

TABLE 1

| Positioning Method | Description |
|---|---|
| Cell-ID | Location estimate is derived based on the identity (ID) of either a cell or WLAN AP serving area in which a terminal is located. Accuracy is dependent on the size of the cell or AP serving area. |
| Enhanced Cell-ID | Location estimate is derived based on cell or AP ID and measurements for round trip delay (RTD), signal strength, etc. Information may be restricted to one cell or AP or may be provided for several cells and/or APs. In the latter case, triangulation may be employed if multiple RTDs are available. |
| AFLT, E-OTD, OTDOA | Location estimate is derived based on timing measurements for base stations in a radio access network. |
| Assisted GPS | Location estimate is derived based on satellite measurements with assistance from a network. |
| Autonomous GPS | Location estimate is derived based on satellite measurements without assistance from any network. |

SET 120 may be capable of communicating with different radio access networks and/or may support different positioning methods. SLP 130 may also support different positioning methods and/or different radio access networks, which may or may not match the positioning methods and radio access networks supported by SET 120.

In one design, the Location ID parameter may include any of the information shown in Table 2. The Cell Info parameter may include GSM cell information, WCDMA cell information, CDMA cell information, or WLAN AP information. The Status parameter may indicate the status of the cell/AP information included in the Cell Info parameter.

TABLE 2

Location ID Parameter

| Parameter | Presence | Value/Description |
|---|---|---|
| Location ID | — | Describes the globally unique cell or WLAN AP identification of the most current serving cell or serving WLAN AP. |
| >Cell Info | M | The following cell IDs are supported: GSM Cell Info WCDMA Cell Info CDMA Cell Info WLAN AP Info |

TABLE 2-continued

Location ID Parameter

| Parameter | Presence | Value/Description |
|---|---|---|
| >Status | M | Describes whether or not the cell or WLAN AP info is: Not Current, last known cell/AP info Current, the present cell/AP info Unknown (i.e. not known whether the cell/AP id is current or not current) NOTE: The Status parameter does not apply to WCDMA optional parameters (Frequency Info, Primary Scrambling Code and Measured Results List). Frequency Info, Primary Scrambling Code and Measured Results List, if present, are always considered to be correct for the current cell. |

In one design, the Multiple Location IDs parameter may include any of the information shown in Table 3. The Multiple Location IDs parameter may include one or more Location ID parameters for one or more radio access networks, which may be obtained at the same time or different times. The Multiple Location IDs parameter may be used, e.g., to report WLAN measurements, cellular base station measurements, and other position related data for multiple access points and base stations near SET 120 at both the current time and recent times in the past.

TABLE 3

Multiple Location IDs Parameter

| Parameter | Presence | Value/Description |
|---|---|---|
| Multiple Location ID | — | This parameter contains a set of up to MaxLidSize Location ID/Relative Timestamp data. |
| Location ID | M | Describes measured globally unique cell/AP identification of the serving cell/AP or cell/AP identification from any receivable radio network. The measured cell/AP identifications may be from different radio access networks measured at the same time or at different times. |
| Relative Timestamp | CV | Time stamp of measured location Id relative to "current location id" in units of 0.01 sec. Range from 0 to 65535 * 0.01 sec. Time stamp for current location Id if present is 0. The Relative Timestamp is present if the Location ID info is historical and may be omitted if the Location ID info is current. |
| Serving Cell Flag | M | This flag indicates whether the Location ID info represents a serving cell or WLAN AP or an idle (i.e., camped-on) cell or WLAN AP. If set, the Location ID info represents serving cell or WLAN AP information. If not set, the Location ID info |

TABLE 3-continued

Multiple Location IDs Parameter

| Parameter | Presence | Value/Description |
|---|---|---|
| | | represents idle mode information or neighbor cell or WLAN AP information. |

In one design, the WLAN AP information sent by SET 120 in the Cell Info parameter of the Location ID parameter in Table 2 may include any of the information shown in Table 4.

Tables for various parameters in SUPL messages are given below. In a table for a given SUPL parameter, the first row of the table gives a short description of the SUPL parameter. Subsequent rows give different fields/parameters of the SUPL parameter, with each field being indicated by symbol ">". A given field/parameter may have subfields, with each subfield being indicated by symbol ">>". A given subfield may have sub-subfields, with each sub-subfield being indicated by symbol ">>>".

TABLE 4

WLAN AP Information

| Parameter | Presence | Value/Description |
|---|---|---|
| WLAN AP Info | — | WLAN Access Point ID |
| >AP MAC Address | M | Access Point MAC Address |
| >AP Transmit Power | O | AP transmit power in dBm |
| >AP Antenna Gain | O | AP antenna gain in dBi |
| >AP S/N | O | AP S/N received at the SET in dB |
| > Device Type | O | Options are:<br>802.11a device,<br>802.11b device, and<br>802.11g device.<br>Future networks are permitted. |
| >AP Signal Strength | O | AP signal strength received at the SET in dBm |
| >AP Channel/Frequency | O | AP channel/frequency of Tx/Rx |
| >Round Trip Delay | O | Round trip delay (RTD) between the SET and AP |
| >>RTD Value | M | Measured RTD value |
| >>RTD Units | M | Units for RTD value and RTD accuracy - 0.1, 1, 10, 100 or 1000 nanoseconds |
| >>RTD Accuracy | O | RTD standard deviation in relative units |
| >SET Transmit Power | O | SET transmit power in dBm |
| >SET Antenna Gain | O | SET antenna gain in dBi |
| >SET S/N | O | SET S/N received at the AP in dB |
| >SET Signal Strength | O | SET signal strength received at the AP in dBm |
| >AP Reported Location | O | Location of the AP as reported by the AP |
| >>Location Encoding | M | Location encoding description<br>LCI as per RFC 3825<br>Text as per RFC 4119<br>ASN.1 as per X.694 |
| >>Location Data | M | Location Data |
| >>>Location Accuracy | O | Location Accuracy in units of 0.1 meter |
| >>>Location Value | M | Location value in the format defined in Location Encoding |

In one design, the GSM cell information sent by SET 120 in the Cell Info parameter of the Location ID parameter in Table 2 may include any of the information shown in Table 5.

TABLE 5

GSM Cell Information

| Parameter | Presence | Value/Description |
|---|---|---|
| Gsm Cell Info | — | GSM Cell ID |
| >MCC | M | Mobile Country Code, range: (0 . . . 999) |
| >MNC | M | Mobile Network Code, range: (0 . . . 999) |
| >LAC | M | Location Area Code, range: (0 . . . 65535) |
| >CI | M | Cell Identity, range: (0 . . . 65535) |
| >NMR | O | Network Measurement Report - can be present for 1 to 15 cells. |
| >>ARFCN | M | ARFCN, range: (0 . . . 1023) |
| >>BSIC | M | BSIC, range: (0 . . . 63) |
| >>RXLev | M | RXLEV, range: (0 . . . 63) |
| >TA | O | Timing Advance, range: (0 . . . 255) |

In one design, the WCDMA cell information sent by SET 120 in the Cell Info parameter of the Location ID parameter in Table 2 may include any of the information shown in Table 6.

TABLE 6

WCDMA Cell Information

| Parameter | Presence | Value/Description |
|---|---|---|
| Wcdma/TD-SCDMA Cell Info | — | WCDMA Cell ID |
| >MCC | M | Mobile Country Code, range: (0 . . . 999) |
| >MNC | M | Mobile Network Code, range: (0 . . . 999) |
| >UC-ID | M | Cell Identity, range: (0 . . . 268435455). UC-ID is composed of RNC-ID and C-ID. |
| >Frequency Info | O | Frequency info can be:<br>fdd:<br>uarfcn-UL, range: (0 . . . 16383)<br>uarfcn-DL, range: (0 . . . 16383)<br>In case of fdd, uarfcn-UL is optional while uarfcn-DL is mandatory. If uarfcn-UL is not present, the default duplex distance defined for the operating frequency band shall be used [3GPP RRC].<br>tdd:<br>uarfcn-Nt, range: (0 . . . 16383)<br>NOTE: Frequency Info and Primary Scrambling Code are always those of the current cell. |
| >Primary Scrambling Code | O | Primary Scrambling Code, range: (0 . . . 511) |
| >Measured Results List | O | Network Measurement Report for WCDMA comprising both intra- and/or inter-frequency cell measurements (as per 3GPP TS 25.331). |

In one design, the CDMA cell information sent by SET 120 in the Cell Info parameter of the Location ID parameter in Table 2 may include any of the information shown in Table 7.

TABLE 7

CDMA Cell Information

| Parameter | Presence | Value/Description |
|---|---|---|
| Cdma Cell Info | — | CDMA Cell ID |
| >NID | CV | Network ID, range: (0 . . . 65535)<br>This parameter is conditional and only used for 1x in which case it is mandatory. |
| >SID | CV | System ID, range: (0 . . . 32767)<br>This parameter is conditional and only used for 1x in which case it is mandatory. |
| >BASEID | CV | Base Station ID, range: (0 . . . 65535)<br>This parameter is conditional and only used for 1x in which case it is mandatory. |
| >SECTORID | CV | Sector ID, length 128 bits<br>This parameter is conditional and only used for HRPD (1xEV-DO) in which case it is mandatory. |
| >BASELAT | M | Base Station Latitude, range:<br>(0 . . . 4194303) |
| >BASELONG | M | Base Station Longitude, range:<br>(0 . . . 8388607) |
| >REFPN | CV | Base Station PN Number, range:<br>(0 . . . 511)<br>This parameter is conditional and only used for 1x in which case it is mandatory. |
| >WeekNumber | M | GPS Week number, range: (0 . . . 65535) |
| >Seconds | M | GPS Seconds, range: (0 . . . 4194303) |

Tables 4 through 7 show specific designs of WLAN AP information, GSM cell information, WCDMA cell information, and CDMA cell information. In general, the cell/AP information for a given radio access network may comprise any information that may be used for positioning of a SET.

With the features in Tables 2 through 7, SET 120 may efficiently send cell/AP information for different supported radio access networks to SLP 130. In particular, SET 120 may send cell/AP information only for radio access networks and measurement parameters supported by SLP 130 and not for radio access networks and measurement parameters not supported by SLP 130. This may reduce waste of radio and processing resources and may also reduce delay to send cell/AP information that SLP 130 cannot use.

Figure 2:
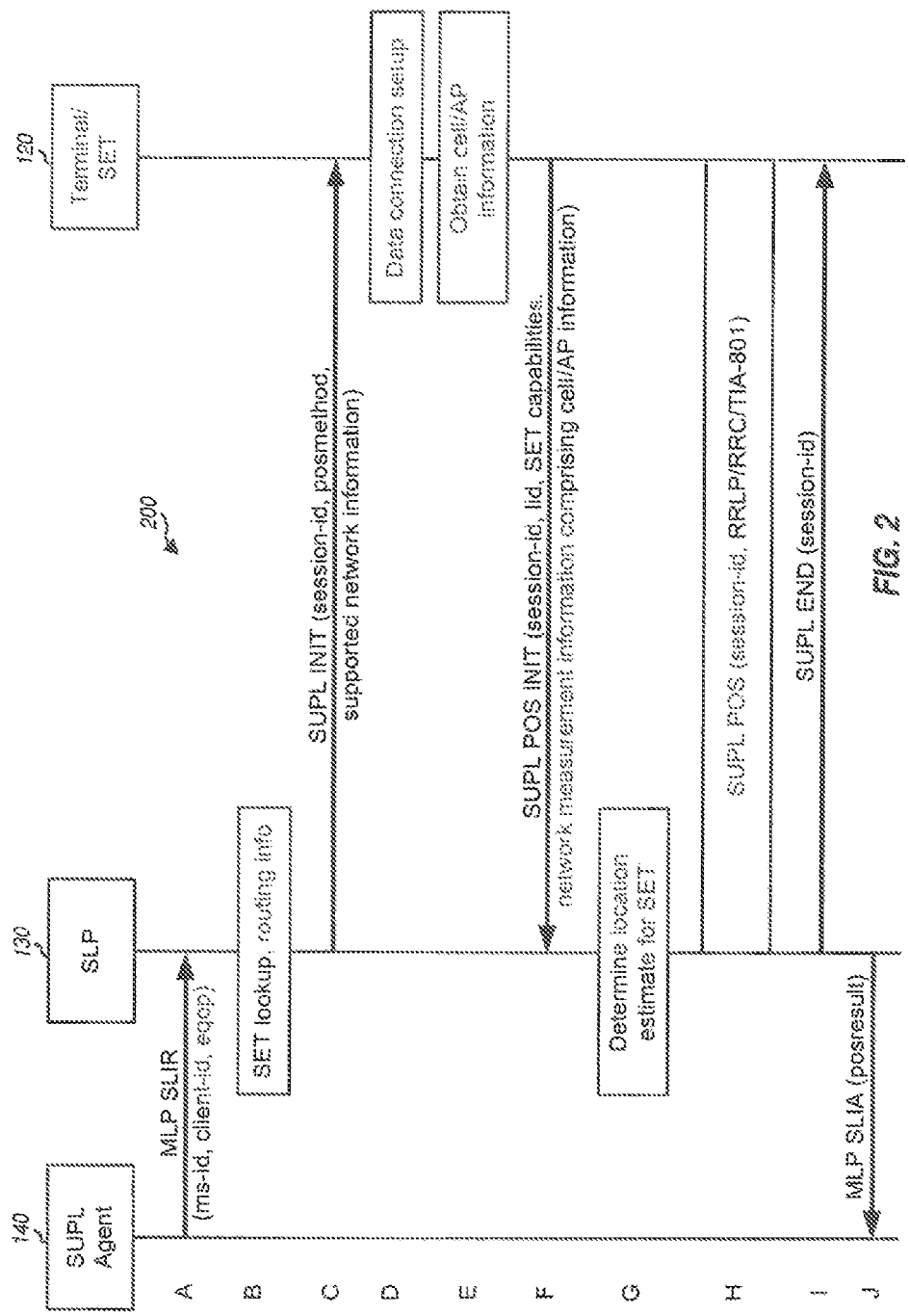
FIG. 2 shows a message flow for network-initiated location services.

FIG. 2 shows a design of a message flow 200 for network-initiated location services in SUPL using supported network information. SUPL agent 140 may desire location information for SET 120 and may send a Mobile Location Protocol (MLP) Standard Location Immediate Request (SLIR) message to SLP 130 (step A). Among the parameters specified in the SLIR may be the expected quality of position (eqop). SLP 130 may authenticate and authorize SUPL agent 140 for the requested location information. SLP 130 may then obtain routing information for SET 120 (step B).

SLP 130 may send a SUPL INIT message to initiate a location session with SET 120 (step C). The SUPL INIT message may include a session-id used to identify the location session, an intended positioning method (pos-method), the desired quality of positioning (QoP), supported network information, etc. Upon receiving the SUPL INIT message, SET 120 may perform a data connection setup procedure, attach itself to a packet data network if the SET is not already attached, and establish a secure IP connection to SLP 130 (step D).

SET 120 may obtain cell or AP information for the radio access network with which SET 120 currently communicates and/or for other radio access networks whose signals SET 120 currently receives or has received (step E). In general, the cell/AP information may include any information for one or more base stations, access points, and/or terminals, which may be pertinent for positioning of a SET. SET 120 may send a SUPL POS INIT message to SLP 130 (step F). The SUPL POS INIT message may include the session-id, Location ID, SET capabilities, and Multiple Location IDs. Location ID and/or Multiple Location IDs may include network measurement information if reported by the SET. SLP 130 may determine a location estimate for SET 120 based on the information contained in the Location ID (LID) received from the SET (step G). If the location estimate obtained from the information contained in the LID is of sufficient quality, then SLP 130 may send a SUPL END message to SET 120 (step I) and may send the requested location information in an MLP Standard Location Immediate Answer (SLIA) message to SUPL agent 140 (step J).

If a location estimate of sufficient quality is not obtained based on the information contained in the LID received from SET 120, then SLP 130 and SET 120 may exchange messages for a positioning session (step H). For SET-assisted positioning, SLP 130 may calculate a location estimate for SET 120 based on positioning measurements received from the SET. For SET-based positioning, SET 120 may calculate the location estimate based on assistance from SLP 130. The location estimate, if any, obtained in step G may be used to assist step H (e.g., may be used to provide assistance data to SET 120 for positioning methods such as A-GPS) and/or may be used to verify and improve any location estimate resulting from step H. In any case, upon completing the positioning session, SLP 130 may send a SUPL END message to SET 120 (step I) and may also send the requested location information to SUPL agent 140 (step J).

If the Location ID received from the SET 120 (Step F) includes Cell Info whose Status is Not Current or Unknown, the SLP 130 may not be able to determine a location estimate for the SET 120. The SLP 130 may then not be able to provide assistance data to the SET 120, which may be needed to support the positioning session of step H of FIG. 2. In some scenarios, the SLP 130 may then use a default location estimate that encompasses a larger range. The quality of this position estimate may not be sufficient to meet the expected quality of position requested by the SUPL Agent 140, or may not be sufficient to provide adequate assistance data to the SET 120. In some cases, the process expected to be completed using the Location ID Parameter information may abort.

As part of the information sent by the SET 120 to the SLP 130 in the SUPL POS INIT message, the SET 120 may have sent the Multiple Location IDs parameter. As seen in Table 3, the Multiple Location IDs parameter presents a history of prior Location IDs with time stamps associated with each entry. The Multiple Location IDs parameter data may allow for the calculation of an approximated position for the SET 120 in the case where the cell/AP information in the Location ID parameter received from the SET 120 includes a Cell ID whose status is Not Current or Unknown. This approximated position for the SET 120 may then be used, instead of the use of a default position of lower quality, or instead of the termination of operation due to lack of knowledge about present position. This approximated position for the SET 120 may be used to generate assistance data needed to support a positioning session (step H).

The historical location data as seen in the Multiple Location IDs parameter may allow for assessment of this location data and for calculation of an approximated location for the SET 120 in circumstances where the current location is not known. The approximated location may also have a quality of position associated based upon the assessment of the historical location data. For example, if the historical location data places the SET 120 in the same location, without discernable motion, over the prior time periods, the SLP 130 may choose that same location as the approximated location of the SET 120 at that present moment. Alternately, if the historic location data shows a trend of motion over the stored time period, curve fitting and/or other trending techniques may be used to predict the present location, and this location may be used as the approximated location of the SET 120 at the present moment. In this context, the historic location data referred to above may consist of cell/AP info, or other data, which may need to be processed to provide actual location.

As seen in Tables 4-7, data contained within the Multiple Location IDs parameter includes a variety of types of data. For each of the timestamped Location ID parameters, there may be an Access Point ID or Cell ID, depending upon the network type. There may also be other data, including measurement data, as seen in Tables 4-7. This other data is not necessary to practice this invention in some aspects. This other data may be used in some aspects. However, what is used is the Access Point ID or Cell ID along with the time at which these IDs were current.

Figure 3:
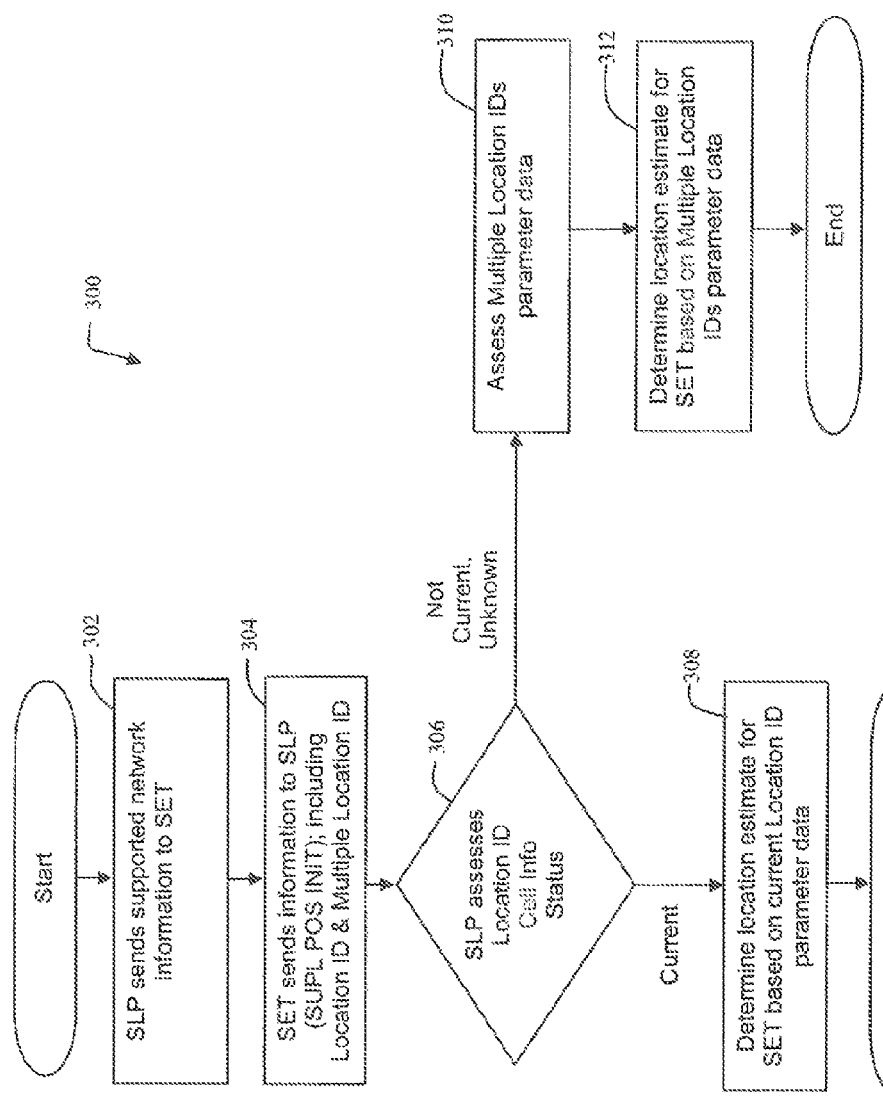
FIG. 3 shows a process performed by an SLP for positioning.

FIG. 3 shows a design of a process 300 performed by an SLP to support positioning in SUPL. Supported network information indicating one or more radio access networks and/or measurement parameters supported by the SLP may be sent to a terminal/SET (block 302). The supported network information may indicate which measurement and/or which information may be sent by the SET. In some aspects, the SET may send information to the network without having received the supported network information. Network measurement information for at least one of the one or more radio access networks supported by the SLP may be received from the SET (block 304). For a network-initiated SUPL session, the supported network information may be sent in a SUPL INIT message, and the network measurement information may be received in a SUPL POS INIT message, e.g., as shown in FIG. 2. For a SET-initiated SUPL session, the supported network information may be sent in a SUPL RESPONSE message or a SUPL TRIGGERED RESPONSE message, and the network measurement information may be received in a SUPL POS INIT message.

The information included in the SUPL POS INIT message will include the Location ID parameter, which has two components: Cell Info and Status (see Table 2). The SLP assesses the Location ID data (block 306). If the Location ID Cell Info Status is Currrent, the SLP may proceed to determine the location estimate for the SET (308). If the Location ID Cell Info Status is other than Current (Not Current or Unknown), the SLP may assess the Multiple Location IDs parameter date (block 310). The historic location data may be used to determine the approximate position of the SET (block 312). The process 300 may be used in either a SET or network initiated scenario.

Figure 4:
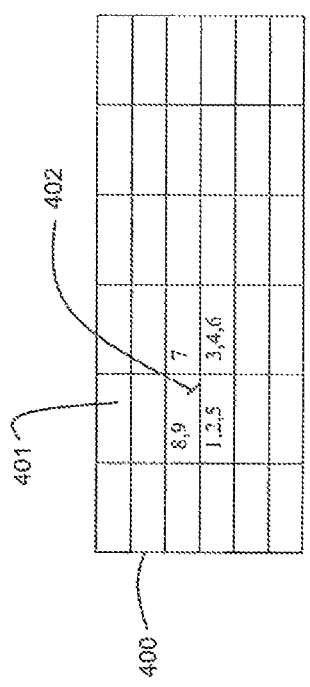
FIG. 4 shows a position grid of the historic locations of an SET.
Figure 5:
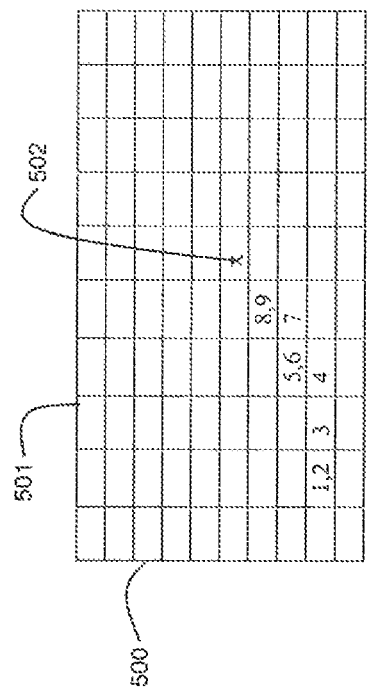
FIG. 5 shows a position grid of the historic locations of an SET.

FIG. 4 illustrates a graphical representation of historic location data. The grid 400 may be broken into blocks 401 which represent location. The blocks may be indicative of a latitude and longitude combination. Although shown here with equal size blocks, the grid may have blocks of different sizes, depending upon the type and quality of data relating to the historic locations. The numbers seen in the grid may represent locations of the SET at earlier time periods, with the lower numbers being further back in time. In this example, the historic locations are located close to each other, and a curve fitting program, or other method of extrapolating position, may select a present approximate position 402. FIG. 5 illustrates a graphical representation of another set of historical location data placed in a grid 500 made up of location blocks 501. The blocks may be indicative of a latitude and longitude combination. The data indicates general motion over time, leading to the selection of an approximate position 502 expected based upon analysis of the data.

As seen in FIG. 3, the Multiple Location ID parameter may contain many Location ID/timestamp entries. With each of the past timestamped Location ID parameters, there may be a Cell Info parameter which is either Current, Not Current, or Unknown. In one design, only prior Location ID parameters wherein the Cell Info is Current will be used in the assessment of the prior location data to determine a current position.

Different Location ID/timestamp entries may have different associated uncertainties with regard to the accuracy of the location. For example, some historic locations may have higher accuracy than others. Curve fitting or trending solutions may take the variable accuracy of the data into account.

Depending upon the coherence of the historic location data relative to time, the expected accuracy of the calculated approximated position may also be assessed using standard methods. For example, if the historic location data is grouped in an orderly manner relative to its time stamp, the deviation of the data from the curve fit to that data may be small, and thus the accuracy may be high. The expected accuracy of the calculated approximated position may depend upon the uncertainty associated with each individual past location data point, as well as the grouping of the past location data points. Thus, a calculated approximate position may or may not be found to be within the expected quality of position as requested by a SUPL Agent, or as needed in another operation.

Figure 6:
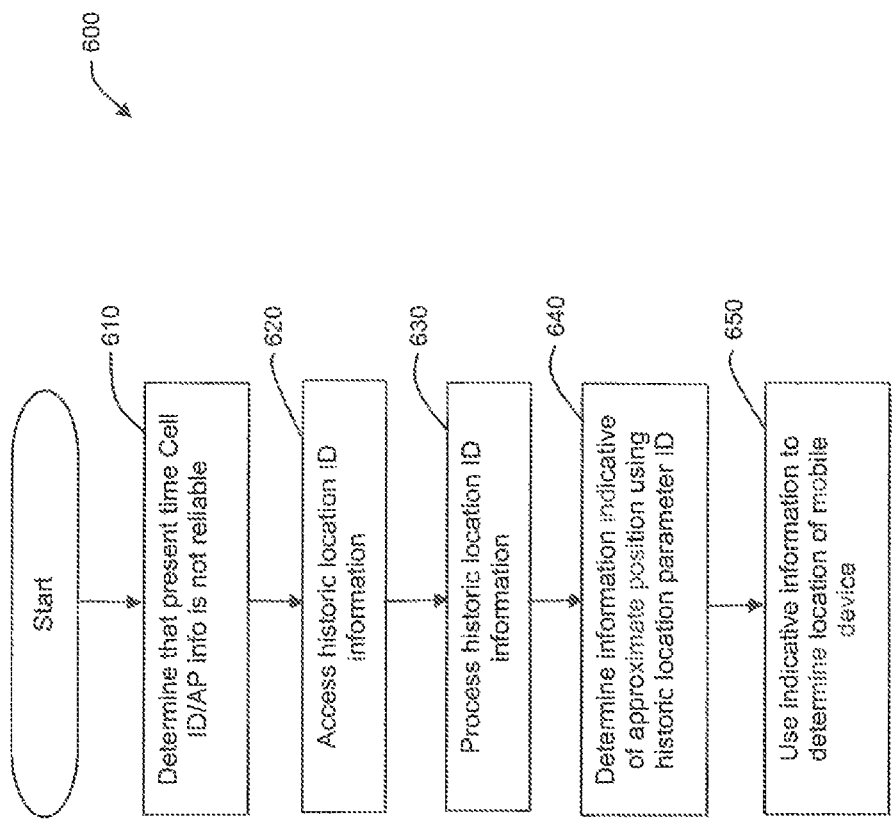
FIG. 6 shows a process that may be used for positioning.

FIG. 6 shows a process 600 that may be used to determine a position of a mobile device such as terminal 120 of FIG. 1. At 610, a determination is made that the current location parameter identification information is not sufficiently reliable. Referring to the implementations described above, this may correspond to a determination that the cell ID or access point ID has a status different from "Current" (e.g., "Unknown" or "Not Current").

At 620, historic location parameter identification information is accessed, based on the determination that the current information is not sufficiently reliable. For example, historic time-stamped cell ID information or access point ID information is accessed.

At 630, the historic location parameter identification information is processed, and an output of the processing is provided. For example, the time-stamped cell ID or access point ID information may be processed using curve-fitting, interpolation, or other trending analysis techniques.

At 640, information indicative of an approximate position of the mobile device is determined using the output of the processing of the historic location parameter identification information. For example, the processing may indicate that the mobile device is stationary (or close to stationary), and the output of the processing may be the cell ID or access point ID that had a status of "Unknown" or "Not Current." In another example, curve fitting or other trending techniques may determine that the mobile device was moving in a particular direction or trajectory, and a different cell ID, access point ID, or position may be provided based on the trend. Note that output of the processing may be different than the kind of information used as an input to the processing. For example, the input may be a cell ID corresponding to a cell associated with a particular position (such as the cell center). However, the output may correspond to a position that is not another cell ID, but rather a position offset from the previous cell ID by a particular amount (determined by the trending analysis). Of course, many implementations are possible.

At 650, the information indicative of the approximate position may be used to determine a provided location for the mobile device. For example, the approximate position information may be used as seed position information for a satellite positioning fix.

The apparatus used to implement the above techniques may include a number of features. For example, a mobile device such as terminal 120 of FIG. 1 may include memory and processor modules to implement the above techniques. For example, the mobile device may be configured to store historic location parameter identification information. The historic location parameter identification information may be associated with time information, as noted above. The historic location parameter identification information can include (for example) serving cell identities with associated status indication, channel information such as frequency, code, and/or timing, received signal strength or service quality and neighboring cell measurements. In one example, the mobile device may store at least time-stamped cell ID and/or access point ID information. The mobile device may also include hardware, software, firmware, or a combination to implement techniques described above. For example, for a SUPL implementation, the mobile device may be configured to format and transmit historic location parameter identification information in the form of the Multiple Location ID parameter.

Similarly, a network device or devices can use the historic location parameter identification information to provide more accurate approximate position information for the mobile device. For example, a network system such as SUPL SLP 130 (which may include one or more servers) may receive historic location parameter identification information and determine more accurate approximate position information therefrom. As noted above, one or more trending techniques may be used.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory and executed by a processor. The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for supporting positioning in Secure User Plane Location comprising:

at a Secure User Plane Location (SUPL) Location Platform (SLP), receiving a SUPL position initiation (SUPL POS INIT) message comprising a Location ID parameter and a Multiple Location IDs parameter from a SUPL Enabled Terminal (SET), wherein the Location ID parameter includes location ID parameter data to indicate a most current serving cell or serving access point for the SET and an associated status of the location ID parameter data, wherein the associated status comprises at least one of a plurality of predefined states of the Location ID parameter, the plurality of predefined states comprising "not current," "current," or "unknown,"

and the associated status of the location ID parameter data is received from the SET; and in response to determining that the associated status of the most current serving cell or serving access point is "current," determining a location estimate for the SET based on the Location ID parameter data for the most current serving cell or serving access point; and in response to determining that the associated status of the most current serving cell or serving access point is "unknown" or "not current," determining the location estimate for the SET based on multiple location IDs parameter data, wherein the Multiple Location IDs parameter includes prior location ID parameter data and associated time stamps for the prior location ID parameter data.

2. The method of claim 1, further comprising:
sending from the SLP to the SET supported network information.

3. The method of claim 1, further comprising:
sending the location estimate to a SUPL agent or the SET or both.

4. The method of claim 1, further comprising:
prior to receiving the SUPL POS INIT message from the SET, transmitting a SUPL initiation (SUPL INIT) message to the SET.

5. The method of claim 4, wherein the SUPL INIT message includes a session ID.

6. The method of claim 1, wherein the associated timestamps include relative timestamps.

7. The method of claim 1, wherein the location ID parameter data includes cell identification information selected from the group consisting of Global System for Mobile Communications (GSM) cell information, Code Division Multiple Access (CDMA) cell information, Wideband CDMA (WCDMA) cell information, and Wireless Local Area Network (WLAN) cell information.

8. The method of claim 1, further comprising:
receiving from a SUPL agent a request message including a request for position information associated with the SET;
sending a SUPL initiation (SUPL INIT) message to the SET in response to receiving the request;
and wherein receiving the SUPL POS INIT message comprising the Location ID parameter and the Multiple Location IDs parameter from the SUPL Enabled Terminal (SET) comprises receiving the SUPL POS INIT message in response to sending the SUPL INIT message.

9. The method of claim 8, wherein the request is a Mobile Location Protocol (MLP) Standard Location Immediate Request (SLIR) message.

10. The method of claim 8, further comprising sending the requested position information to the SUPL agent, wherein the requested position information is based on the location estimate.

11. A Secure User Plane Location (SUPL) platform comprising:
means for receiving a SUPL position initiation (SUPL POS INIT) message comprising a Location ID parameter and a Multiple Location IDs parameter from a SUPL Enabled Terminal (SET), wherein the Location ID parameter includes location ID parameter data to indicate a most current serving cell or serving access point for the SET and an associated status of the location ID parameter data, wherein the associated status comprises at least one of a plurality of predefined states of the Location ID parameter, the plurality of predefined states comprising "not current," "current," or "unknown,"

and the associated status of the location ID parameter data is received from the SET; and means for determining, in response to determining that the associated status of the most current serving cell or serving access point is "current," a location estimate for the SET based on the Location ID parameter data for the most current serving cell or serving access point; and means for determining, in response to determining that the associated status of the most current serving cell or serving access point is "unknown" or "not current," the location estimate for the SET based on multiple location IDs parameter data, wherein the Multiple Location IDs parameter includes prior location ID parameter data and associated time stamps for the prior location ID parameter data.

12. An apparatus for supporting positioning in Secure User Plane Location (SUPL) comprising:
receive circuitry to receive at a SUPL location Platform (SLP) a SUPL position initiation (SUPL POS INIT) message comprising a Location ID parameter and a Multiple Location IDs parameter from a SUPL Enabled Terminal (SET), wherein the Location ID parameter includes location ID parameter data to indicate a most current serving cell or serving access point for the SET and an associated status of the location ID parameter data, wherein the associated status comprises at least one of a plurality of predefined states of the Location ID parameter, the plurality of predefined states comprising "not current," "current," or "unknown,"

and the associated status of the location ID parameter data is received from the SET; and processor circuitry to access the location ID parameter data and the multiple location IDs parameter data and further configured to:
determine a location estimate for the SET based on the Location ID parameter data for the most current serving cell or serving access point in response to determining that the associated status of the most current serving cell or serving access point is "current"; and
determine a location estimate for the SET based on multiple location IDs parameter data in response to determining that the associated status of the most current serving cell or serving access point is "unknown" or "not current," wherein the Multiple Location IDs parameter includes prior location ID parameter data and associated time stamps for the prior location ID parameter data.

13. A non-transitory computer readable medium comprising instructions that when executed by a computer cause the computer to perform operations comprising:

access Secure User Plane Location (SUPL) position initiation (SUPL POS INIT) message information comprising a Location ID parameter and a Multiple Location IDs parameter received at a SUPL Location Platform (SLP) from a SUPL Enabled Terminal (SET), wherein the Location ID parameter includes location ID parameter data to indicate a most current serving cell or serving access point for the SET and an associated status of the location ID parameter data, wherein the associated status comprises at least one of a plurality of predefined states of the Location ID parameter, the plurality of predefined states comprising "not current," "current," or "unknown,"

and the associated status of the location ID parameter data is received from the SET; and determine a location estimate for the SET based on the Location ID parameter data for the most current serving cell or serving access point in response to determining that the associated status of the most current serving cell or serving access point is current; and determine a location estimate for the SET based on multiple location IDs parameter data in response to determining that the associated status of the most current serving cell or serving access point is unknown or not current, wherein the Multiple Location IDs parameter includes prior location ID parameter data and associated time stamps for the prior location ID parameter data.

* * * * *